US006613462B2

United States Patent
Macki et al.

(10) Patent No.: US 6,613,462 B2
(45) Date of Patent: Sep. 2, 2003

(54) METHOD TO FORM DENSE COMPLEX SHAPED ARTICLES

(75) Inventors: James M. Macki, Sequin, WA (US); Eric A. Ness, Beaverton, OR (US); Robert T. Nilsson, Midland, MI (US); Ellen M. Dubensky, Midland, MI (US); Walter J. Rozmus, Jr., Traverse City, MI (US); Clifford A. Kelto, Williamsburg, MI (US); Edward E. Timm, Freeland, MI (US)

(73) Assignee: Dow Global Technologies Inc., Midland, MI (US)

( * ) Notice: Subject to any disclaimer, the term of this patent is extended or adjusted under 35 U.S.C. 154(b) by 0 days.

(21) Appl. No.: 09/943,556

(22) Filed: Aug. 29, 2001

(65) Prior Publication Data

US 2002/0005085 A1 Jan. 17, 2002

Related U.S. Application Data

(62) Division of application No. 09/009,631, filed on Jan. 20, 1998, now Pat. No. 6,315,945.
(60) Provisional application No. 60/052,899, filed on Jul. 16, 1997.

(51) Int. Cl.[7] .......................... B32B 15/00; B32B 18/00; B32B 9/04
(52) U.S. Cl. ..................................... 428/698; 428/539.5
(58) Field of Search ............................... 428/539.5, 698

(56) References Cited

U.S. PATENT DOCUMENTS

| | | | |
|---|---|---|---|
| 2,842,342 A | 7/1958 | Haglund | 255/63 |
| 2,888,247 A | 5/1959 | Hagund | 255/63 |
| 2,999,309 A | 9/1961 | Kuzmick et al. | 29/194 |
| 3,309,123 A | 3/1967 | Edwards et al. | 287/189.365 |
| 3,743,489 A * | 7/1973 | Wentorf, Jr. et al. | 51/307 |
| 4,359,335 A | 11/1982 | Garner | 75/208 |
| 4,372,404 A | 2/1983 | Drake | 175/374 |
| 4,398,952 A | 8/1983 | Drake | 419/18 |
| 4,562,090 A | 12/1985 | Dickson et al. | 427/34 |
| 4,594,219 A | 6/1986 | Hostatter et al. | 419/8 |
| 4,596,694 A | 6/1986 | Rozmus | 419/49 |
| 4,656,002 A | 4/1987 | Lizenby et al. | 419/10 |
| 4,705,124 A | 11/1987 | Abrahamson et al. | 175/410 |
| 4,722,405 A * | 2/1988 | Langford, Jr. | 175/374 |
| 4,744,943 A | 5/1988 | Timm | 419/10 |
| 4,756,677 A | 7/1988 | Hribernik et al. | 419/8 |
| 4,892,848 A | 1/1990 | Yoshida et al. | 264/65 |
| 4,950,557 A | 8/1990 | Nakai et al. | 428/698 |
| 5,154,245 A | 10/1992 | Waldenstrom et al. | 175/420.2 |
| 5,156,725 A | 10/1992 | Doktycz et al. | 204/192.16 |
| 5,217,081 A | 6/1993 | Waldenstrom et al. | 175/420.2 |
| 5,232,522 A | 8/1993 | Doktycz et al. | 148/218 |
| 5,318,214 A | 6/1994 | Lucas, Jr. et al. | 228/121 |
| 5,333,520 A | 8/1994 | Fischer et al. | 76/108.2 |
| 5,487,865 A | 1/1996 | Hampton et al. | 419/5 |
| 5,543,235 A | 8/1996 | Mirchandani et al. | 428/547 |
| 5,554,338 A | 9/1996 | Sugihara et al. | 419/5 |
| 5,786,076 A * | 7/1998 | Ederyd et al. | 428/325 |
| 5,880,382 A | 3/1999 | Fang et al. | 75/236 |
| 5,904,993 A | 5/1999 | Takeuchi et al. | 428/627 |
| 5,930,581 A | 7/1999 | Born et al. | 419/5 |
| 6,033,735 A * | 3/2000 | Ederyd et al. | 427/380 |
| 6,033,788 A | 3/2000 | Cawley et al. | 428/548 |
| 6,146,581 A | 11/2000 | Bitz et al. | 419/5 |

FOREIGN PATENT DOCUMENTS

EP 0852525 B1 12/1999

\* cited by examiner

*Primary Examiner*—Daniel J. Jenkins

(57) ABSTRACT

A consolidated complex shaped article having a density of at least about 95 percent of theoretical density is prepared by placing a plurality of separate bodies in an arrangement, such that each separate body is in contact with at least one other separate body to form an aggregate body and wherein at least one of the separate bodies is essentially dense. The material of each separate body is comprised of a ceramic, a cermet or a metal. The aggregate body is then consolidated at a consolidating temperature, superatmospheric pressure and time at temperature and time at superatmospheric pressure sufficient to form a consolidated shaped article. In consolidating the aggregate body, the consolidating temperature is a temperature that fails to form a liquid within at least one separate body and the superatmospheric temperature is applied for at least a portion of the time at the consolidating temperature.

8 Claims, No Drawings

METHOD TO FORM DENSE COMPLEX SHAPED ARTICLES

CROSS-REFERENCE TO RELATED APPLICATION

This application is A Divisional Application of application Ser. No. 09/009,631 filed Jan. 20, 1998 now U.S. Pat. No. 6,315,945 which claims the benefit of U.S. Provisional Application No. 60/052,899, filed Jul. 16, 1997.

FIELD OF THE INVENTION

The invention relates to a method to form a shaped article from separate bodies. In one embodiment, the method produces a shaped composite article from bodies of dissimilar materials such as a composite article comprised of a cermet and a ceramic.

BACKGROUND OF THE INVENTION

Ceramics and ceramic-metal composite (i.e., cermet) are usually formed by powder metallurgical methods. A ceramic is an inorganic nonmetallic material, such as an oxide, carbide, nitride, boride, silicide or alloy thereof. A cermet is a material containing a ceramic and a free metal, such as a cemented tungsten carbide. In forming a ceramic or cermet, a powder or powder mixture is shaped into a porous body (i.e., greenware) by techniques, such as pressing or slip casting. The greenware is then heated to remove volatile materials, such as water and plastic binders, and, subsequently, heated to a higher temperature to form a dense body. The greenware typically displays a linear shrinkage of about 15 percent. The shrinkage may vary within the part due to differing powder compaction, such as between regions having significantly different cross-sectional areas. When the shrinkage between two areas is too large, the part tends to crack during heating.

Several methods have been employed to make complex shaped cermet and ceramic bodies via powder metallurgical techniques. Techniques that have been employed include machining of the greenware (e.g., spark plugs) and injection molding (e.g., turbocharger rotors). Greenware machining causes significant loss of material and, generally, cannot form highly complex or small parts due to, among other things, the fragility of the greenware body. Injection molding requires expensive tooling and heating of the molded body for long times to remove plastic additives needed to form the body.

Recently, U.S. Pat. No. 5,333,520 disclosed complexed shaped cermets made by uniaxially pressing two or more shapes that are placed upon each other with the joint between them lying essentially horizontally and, subsequently, sintering to form a complex shaped body. The two bodies may be of differing composition, but when the compositions are different, the shrinkage must be similar to avoid breakage, thus limiting the body compositionally.

Composite structures of metal, ceramics and cermets have also been formed by pressing, in a die, differing powder compositions to form a composite green body (shaped porous powder compact). The composite green body has regions that are comprised of different powder compositions. The green body is then sintered to form a dense body. Examples of this technique are described in U.S. Pat. Nos. 4,329,175; 4,372,404 and 4,602,956.

Because each of the techniques described above requires the sintering of a powder compact having differing compositions, the interface between regions in the body is dictated by the sintering. Because of the time and temperature it takes to sinter, the interface between regions tends to be diffuse. The variation of composition is also limited by the sintering shrinkage between the differing powder compositions.

Therefore, it would be desirable to provide a method of forming a complex shaped or composite body of a metal, ceramic, cermet or combination thereof that avoids one or more of the problems of the aforementioned methods.

SUMMARY OF THE INVENTION

A first object of the invention is a method for preparing a consolidated shaped article comprising:

placing a plurality of separate bodies in an arrangement, such that each separate body is in contact with at least one other separate body to form an aggregate body, and wherein at least one of the separate bodies is essentially dense and the separate bodies are comprised of a material selected from the group consisting of a ceramic, a cermet and a metal and consolidating the aggregate body at a consolidating temperature, superatmospheric pressure and time at temperature and time at superatmospheric pressure sufficient to form the consolidated shaped article, wherein (i) the consolidating temperature is a temperature that fails to form a liquid within at least one separate body, (ii) at least a portion of the time at superatmospheric pressure is at the consolidating temperature and (iii) the consolidated shaped article has a density of at least about 95 percent of theoretical density.

A second object of this invention is a consolidated shaped article comprised of (i) a cermet body directly chemically bonded to (ii) a ceramic body selected from the group consisting of a carbide and a carbonitride.

A third object of this invention is a consolidated shaped article comprised of (i) a cermet body directly chemically bonded to (ii) a ceramic body and having (iii) an interface that has a thickness of at most about 2 mm between said cermet and ceramic body.

The instant method may be used to make complex shaped bodies of metals, cermets, ceramics and combinations thereof. The method may be used to fabricate items, such as drill bits, rock drilling inserts, knives, rotor blades and tubes.

DETAILED DESCRIPTION OF THE INVENTION

The present invention is directed to a method for forming complex shaped articles that may be comprised of dissimilar materials, wherein the interface between the materials may be very narrow. Dissimilar materials, herein, are materials having different chemistry, different microstructure or combination thereof. Examples of dissimilar material pairs include different compounds (e.g., ceramic:metal) different metals (e.g., Ni alloy:steel), different ceramics (e.g., aluminum oxide:zirconium oxide), differing cermets (e.g., a cemented carbide having a large carbide grain size versus a cemented carbide having a small carbide grain size and a cemented carbide having a large amount of binder metal versus a cemented carbide having a small amount of binder metal).

The method first involves placing a plurality of separate bodies in an arrangement, such that each separate body is in contact with at least one other separate body to form an aggregate body. As an illustration, three separate bodies having the same cube shape may be placed one on top of each other forming a columnar aggregate body having a top, middle and bottom separate body. The same three cube shaped separate bodies may be placed such that one cube shaped body rests on top of two bottom cube shaped separate bodies to form a triangular shaped aggregate body.

A separate body, herein, means a body that supports its own weight and defines its own shape (i.e., does not conform to another shape such as a coating). "Supports its own weight," herein, means the body may be handled by hand without substantially deforming or breaking (i.e., the body has the same shape before and after handling). Thus, the separate body, herein, precludes, for example, foils (e.g., graphite foil and metal foil), thin wires, threads and a coating on a substrate.

In forming the aggregate body, at least one of the separate bodies is essentially dense. "Essentially dense," herein, means a separate body having a density of at least about 90 percent of theoretical. Preferably said separate body has a density of at least about 93 percent, more preferably at least about 95 percent, even more preferably at least about 98 percent, and most preferably at least about 99 percent of theoretical density. Herein, the theoretical density is the theoretical density described on page 530 of *Introduction to Ceramics* 2$^{nd}$ *Ed.*, W. D. Kingery et al., John Wiley and Sons, New York, 1976. Preferably each of the separate bodies of the aggregate body is essentially dense. More preferably each of the separate bodies has a density of at least about 95 percent, even more preferably at least about 98 percent and most preferably at least about 99 percent of theoretical density.

The separate bodies are comprised of a material selected from the group consisting of a ceramic, cermet and metal. A ceramic, herein, is an inorganic nonmetallic material, such as an oxide, nitride, carbide, boride, silicide, mixtures of these and inorganic alloys of these (e.g., titanium carbonitride and tungsten-molybdenum carbide). The ceramic may be crystalline or amorphous or combination thereof. Examples of specific ceramics include aluminum nitride, silicon nitride, silicon carbide, tungsten carbide, tungsten carbide-molybdenum carbide, aluminum oxide, zirconium oxide, titanium carbide-aluminum oxide and boron carbide. Preferably the ceramic is crystalline. It is also preferred that the ceramic is polycrystalline (i.e., not a single crystal). Preferably the ceramic is a carbide, boride, nitride, combination of these or alloy of these ceramics. More preferably the ceramic is a carbide. Even more preferably the ceramic is a carbide of a metal selected from the group consisting of silicon, boron, titanium, tungsten, tantalum, hafnium, zirconium, vanadium, chromium, niobium and combination thereof. Most preferably the ceramic is a carbide of tungsten, molybdenum, titanium or combination thereof.

A cermet is a composite of the ceramic just described and a free metal. That is to say, the metal is not present in a non-metal compound, such as the ceramic described above. Examples of a metal include transition metals, rare earth metals, beryllium, magnesium, aluminum and alloys thereof. The metal is preferably Y, Ce, Zr, La, Hf, Al, Be, Mg, a first row transition metal (i.e., Sc, Ti, V, Cr, Mn, Fe, Co, Ni and Zn) and metal alloys thereof. More preferably the metal is Al, Mg, Ti, Co, Ni, Fe, Cu and metal alloys thereof. More preferably the metal is Co, Ni, Fe and alloys thereof. Most preferably the metal is cobalt and alloys thereof.

The amount of metal in the cermet may be any amount that is easily detected by bulk analysis techniques, such as X-ray diffraction. Generally, the amount of free metal is at least about 0.5 percent to at most about 90 percent by weight of the cermet. Preferably the amount of metal is at most about 80 percent, more preferably at most about 21 percent, even more preferably at most about 18 percent and most preferably at most about 6 percent to preferably at least about 0.75 percent, more preferably at least about 1 percent, even more preferably at least about 1.5 percent and most preferably at least about 2.0 percent by weight of the cermet.

The metal is as commonly understood and is the same as the free metal described above. Preferably the metal is a ferrous metal.

The separate body may be a body that is porous (i.e., not essentially dense). A porous separate body has a theoretical density of at most about 90 percent of theoretical to a porosity, wherein the body has insufficient strength to maintain its shape during handling and contacting with another separate body. Generally, the density is at least about 40 percent, preferably at least about 50 percent, more preferably at least about 60 percent and most preferably at least about 65 percent to preferably at most about 85 percent, more preferably at most about 80 percent and most preferably at most about 75 percent of theoretical density.

The separate body that is essentially dense (i.e., "essentially dense separate body") may be formed by any convenient or known technique for a given type of body (e.g. ceramic, cermet and metal). For example, the ceramic, metal or cermet may be formed by a convenient or known powder metallurgical technique. In general, powder metallurgical or ceramic techniques involve: (1) mixing of the powder components of the body to be produced, (2) shaping a body from the mixed powders, (3) heating the shaped body to densify it and (4) optionally machining or finishing the body to its final shape. Each of these steps is described in greater detail in *Introduction to the Principles of Ceramic Processing*, J. Reed, John Wiley and Sons, New York, 1988 and in *Fundamental Principles of Powder Metallurgy*, W. D. Jones, E. Arnold, London, 1960, each incorporated herein by reference. An essentially dense cermet body may also be formed by infiltrating a metal into a porous ceramic body by a metal infiltration technique, such as those described by U.S. Pat. Nos. 3,864,154; 4,702,770; 4,718,941; 5,039,633; 5,394,929 and 5,595,622, each incorporated herein by reference. An essentially dense metal body may also be formed by the powder metallurgical techniques described above and any convenient metallurgical technique, such as those known in the art. Exemplary convenient metal forming techniques include casting, forging and extrusion described in *Manufacturing Engineering and Technology* 2$^{nd}$ *Ed.* S. Kalpakjian, Addison-Wesley Publishing Co., New York, 1992, incorporated herein by reference.

A separate body that is not essentially dense "porous separate body" may be formed by any convenient process, such as those known in the art. For example, the powder metallurgical or ceramic technique just described for making an essentially dense separate body may be used, except that the shaped body from the mixed powders is not heated or is heated insufficiently to form an essentially dense body (i.e., forms a porous separate body).

In a first preferred embodiment, the separate bodies of the aggregate body are comprised of a material selected from a cermet or a ceramic. In this embodiment, it is preferred that a separate body consisting of the ceramic (i.e., "ceramic separate body") is in contact with a separate body consisting of the cermet (i.e., "cermet separate body"). Preferably when there is a ceramic body and a cermet body in the aggregate body, the cermet body is in contact with a ceramic selected from the group consisting of tungsten carbide, molybdenum carbide, hafnium carbide, titanium carbide, vanadium carbide, chromium carbide, niobium carbide, tantalum carbide, zirconium carbide, alloys of these carbide and mixtures of these carbides. It is understood that these carbides essentially lack a binder metal, such as cobalt in the free metal state (herein binderless carbide). For example, the carbide generally has at most 0.5 percent by weight of a binder metal such as Fe, Co and Ni and said metal is alloyed with the carbide (i.e. metal is not free metal). The ceramic is more preferably a binderless tungsten carbide, described by U.S. Pat. Nos. 5,563,107 and 5,612,264, or tungsten carbide-molybdenum carbide alloy, described by U.S. Pat. Nos. 4,945,073; 5,215,945; 5,223,460 and 5,256,608. Each of the aforementioned patents are incorporated herein by reference.

The cermet of the first preferred embodiment is preferably a cemented carbide. A cemented carbide is a carbide having a binder metal, the carbide being one of those described in the previous paragraph. The binder metal is a metal such as iron, nickel and cobalt. The binder metal is present in sufficient quantity, such that free metal is present in the cemented carbide body. Preferably the total amount of binder metal is at most about 18 percent to at least about 2 percent by weight of the cermet body. More preferably the amount of binder metal is at most about 10 percent to at least about 4 percent by weight of the cermet separate body.

Most preferably the aggregate body of the first embodiment is comprised of one separate body that is an essentially dense binderless tungsten carbide or binderless tungsten carbide-molybdenum carbide, in contact with one essentially dense cemented tungsten carbide. Preferably the binderless tungsten carbide or tungsten carbide-molybdenum carbide separate body has a density of at least 99 percent of theoretical. Preferably the cemented tungsten carbide body also has a density of at least about 99 percent of theoretical.

In a second preferred embodiment, each of the separate bodies of the aggregate body is comprised of a cermet. Preferably the cermet has a binder metal and a binder metal concentration described previously for the first preferred embodiment. Preferably the aggregate body of the second embodiment is comprised of a first separate body that is different than a second separate body contacting said first body. Different means, in this specific context, that the first body has (1) a binder metal concentration that is at least about 1 percent by volume different than the binder metal concentration of the second body or (2) an average ceramic grain size that is at least about 10 percent different than the average ceramic grain size of the second body. More preferably the first and second separate bodies are comprised of cemented tungsten carbide. Preferably the binder metal concentration of the first body and second body fall within the range of about 2 percent to about 18 percent by weight. Preferably the binder metal of the first and second cemented carbide bodies is cobalt, iron, nickel or combination thereof. More preferably the binder metal is cobalt.

In the second embodiment, it is also preferred that each of the separate bodies is essentially dense, more preferably each of the separate bodies has a density of at least about 99 percent of theoretical density.

The average ceramic grain size (e.g., WC grain size in a cemented tungsten carbide body) may be determined from a scanning electron micrograph (SEM) of a polished section of the body, wherein the average grain size may be determined by the intercept method described by Underwood in *Quantitative Stereology*, Addison Wesley, Reading, Mass., (1970). The amount of binder metal may be determined by a known technique such as X-ray diffraction.

In a third preferred embodiment, at least one of the separate bodies is a porous body. Preferably the porous body is a ceramic or a cermet. Preferably the porous body is contacted with an essentially fully dense separate body that is a cermet or a ceramic.

When selecting separate bodies to be contacted to form the aggregate body, which eventually forms a dense consolidated shaped body, it is preferred that each separate body contains at least one element or compound that can react to form a new phase or can form a solution (i.e., alloys) with at least one element or compound of the body or bodies it is in contact with. As an illustration, the WC of a binderless tungsten carbide alloys with the cobalt of a cemented tungsten carbide to form a W—Co—C phase. However, it is not necessary for the separate bodies to have said elements or compounds to form the consolidated dense article of this invention. For example, a sufficient bond may be achieved between two bodies of differing materials due to a mechanical bond, such as a compressive force due to thermal expansion mismatch of the dissimilar separate bodies.

Also, when selecting separate bodies to form the aggregate body, the materials of the separate bodies should not be so dissimilar that the aggregate body cannot be formed into the dense consolidated shaped body of this invention. For example, the temperature that a first porous body densifies should not be so different than a porous body it contacts, such that the first body fails to densify or alternatively slumps, due to melting of one or more of its components. The present invention, where all of the separate bodies are essentially dense, avoids the cracking problem of the prior art associated with shrinkage of porous powder bodies.

Also, for example, the separate bodies in contact should not have such disparate thermal expansion coefficients that one of the contacting bodies cracks upon consolidation. The separate bodies, generally, should have a thermal expansion coefficient that is near the thermal expansion coefficient of the other separate bodies to avoid cracking of the article. For example, in choosing a separate body, the body's coefficient of thermal expansion should be from about 50 percent to 200 percent of the thermal expansion coefficient of the separate body it is in contact with, wherein the thermal expansion is the thermal expansion of a dense body (i.e., a density of at least about 95 percent of theoretical density). Preferably, the separate body has a thermal expansion coefficient that is at least about 80 percent, more preferably at least about 90 percent to at most about 120 percent more preferably at most about 110 percent of the thermal expansion coefficient of each of the separate body or bodies it contacts.

To form the consolidated shaped article, it is necessary that the separate bodies are contacted to form the consolidated shaped article. It is preferred that the separate bodies are placed in contact in the absence of a bonding agent, such as a brazing compound (e.g., metal). It is also preferred that the aggregate body is wrapped with a barrier layer, such as graphite foil or boron nitride, to maintain the positions of the separate bodies of the aggregate body and to impede the penetration, for example, by the viscous pressure transmitting material of the ROC process, described herein, between the separate bodies.

The aggregate body is then consolidated at a temperature, superatmospheric pressure, time at temperature and time at superatmospheric pressure sufficient to form the consolidated shaped article. The consolidated shaped article has a shape defined by each of the separate bodies used to make said article.

The consolidation temperature is dependent on the materials of the separate bodies in an aggregate body and said temperature must be a temperature that fails to form a liquid within (i.e., not at the interface but in the interior of the body) at least one separate body during consolidation of the aggregate body to form the consolidated shaped article. That is to say, the temperature must be below a temperature where a liquid would form in a lone separate body subjected to the consolidation temperature, under the same conditions present when consolidating the aggregate body. Of course, it is readily apparent that at the interface of any separate body a liquid may be present, for example, from a contacting separate body that does form a liquid at the consolidation temperature. Preferably the consolidation temperature is a temperature where a liquid fails to form in any of the separate bodies of the aggregate body, including the interface between said separate bodies. For example, when each of the separate bodies is a cemented tungsten carbide-cobalt body, the consolidation temperature is below the temperature where a cobalt-tungsten carbide eutectic liquid forms.

A suitable consolidating temperature is from about 500° C. to about 1800° C. As an illustration, when ROCing, described herein, cemented tungsten carbide separate bodies, binderless tungsten carbide bodies or combinations thereof, a suitable temperature range is from about 900° C. to about 1350° C., preferably the temperature range is from about 1000° C. to about 1325° C., more preferably from about 1100° C. to about 1300° C, and most preferably from about 1150° C. to about 1275° C.

The time at the consolidating temperature (time at temperature) is desirably as short as possible, while still forming the consolidated shaped article. The time should be a time that fails to cause exaggerated grain growth within any of the separate bodies, while still achieving the desired density of the consolidated shaped article. Suitable times range from about 1 minute to about 24 hours. Preferably the time is at most about 12 hours, more preferably at most about 6 hours, even more preferably at most about 3 hours and most preferably at most about 1 hour to preferably at least about 5 minutes, more preferably at least about 10 minutes, and most preferably at least about 15 minutes.

The entire time, or only a portion of the time at the consolidating temperature, may be at the superatmospheric pressure, according to this invention (i.e., the time at superatmospheric pressure is less than or equal to the time at temperature). For practical reasons, the time at superatmospheric pressure is advantageously as short as possible, while still attaining the consolidated shaped article. Preferably the time at superatmospheric pressure at the consolidating temperature is at most about 30 minutes, more preferably at most about 10 minutes, even more preferably at most about 60 seconds, and most preferably at most about 15 seconds to preferably at least about 2 seconds.

The superatmospheric pressure at the consolidating temperature should be a pressure greater than atmospheric pressure that is capable of forming the consolidated shaped article. However, the superatmospheric pressure should be less than a pressure where the body would catastrophically fail, for example, due to (1) excess plastic deformation or (2) exceeding the compressive strength of the material of one or more of the separate bodies. Preferably the superatmospheric pressure is at most about 1,000,000 pounds per square inch "psi" (6.89 GPa), more preferably at most about 500,000 psi (3.45 GPa) to preferably at least about 10,000 (68.9 MPa) psi, more preferably at least about 50,000 psi (345 MPa), and most preferably at least about 100,000 psi (689 MPa).

Representative methods for consolidating the aggregate body include Rapid Omnidirectional Compaction (ROC), hot isostatic pressing (HIP), or the methods described in U.S. Pat. Nos. 4,667,497; 4,853,178; 5,246,638 and 5,348,694, each incorporated herein by reference. Preferably the method is ROC, various aspects being taught by Timm (U.S. Pat. No. 4,744,943), Lizenby (U.S. Pat. Nos. 4,656,002 and 4,341,557), Rozmus (U.S. Pat. No. 4,428,906) and Kelto (*Metals Handbook*, "Rapid Omnidirectional Compaction," Vol. 7, pages 542–546), each incorporated herein by reference.

In the ROC process, according to the present invention, the aggregate body generally is first embedded in a pressure transmitting material that acts like a viscous liquid at the consolidating temperature, the material and body being contained in a shell. The aggregate body is desirably enveloped in a barrier layer, such as graphite foil or boron nitride. The barrier layer may also maintain the contact of the separate bodies, allowing the bodies to be configured without regard to orientation. Suitable pressure transmitting materials include glasses that have sufficient viscosity so that the glass fails to penetrate the body under an applied pressure. Representative glasses include glasses containing high concentrations of silica and boron. A commercial glass useful in the temperature range from 1000° C. to 1400° C. is Corning-type PYREX 7740™ glass. Pressure transmitting materials are described in more detail in U.S. Pat. Nos. 4,446,100; 3,469,976; 3,455,682 and 4,744,943, each incorporated herein by reference.

The shell containing the aggregate body or bodies and pressure transmitting medium preferably forms an enclosed right cylinder that can be placed in pot die tooling of a forging press. The pot die tooling, as it is known in the forging industry, consists of a cylindrical cavity closed at one end by an ejector assembly and at the other by a cylindrical ram. Upon compression in the tooling, the shell must distort predictably and not crack or leak.

The preferred shell material for the temperature range from 150° C. to about 1650° C., using glass pressure transmitting media, is a shell cast of a thixotropic ceramic, as described by U.S. Pat. No. 4,428,906, at col. 3, lines 58–68, and col. 4, lines 1–27, incorporated herein by reference. The thixotropic ceramic material comprises a ceramic skeleton network and pressure transmitting material that deforms or fractures, allowing compression of the pressure transmitting material while retaining enough structural integrity to keep the pressure transmitting fluid from leaking out of the pot die.

Once the aggregate body or bodies are embedded in the pressure transmitting material contained in the shell, this shell assembly is heated in an inert atmosphere, such as a noble gas to a temperature suitable for forging. The temperature of this step is as described previously. The time at temperature must be a time sufficient to completely fluidize the pressure transmitting medium and to bring the aggregate body or bodies to a temperature roughly in equilibrium with the temperature of the pressure transmitting material. Typical times range from about 1 to 3 hours for both heating to the consolidating temperature and maintaining the consolidating temperature. The time at the consolidating temperature is maintained generally from about 1 to 30 minutes before being pressed in the pot die of the forging pressed, described below.

The heated shell assembly is pressed in a forging press, as described below and by Timm, U.S. Pat. No. 4,744,943, at col. 9, lines 50–68, and col. 10, lines 1–3, incorporated herein by reference. The heated shell is pressed in the forging press by compressing the assembly with a ram in a closed cavity, such as the pot die tooling previously described. As the ram compresses the assembly in the cavity, the pressure transmitting material exerts a large hydrostatic pressure on the articles to consolidate them. The shell material of the assembly flows into the clearance between the ram and pot die and forms, in effect, a pressure seal so that the liquid pressure transmitting material does not escape into the pot die. After pressing, the shell assembly is ejected from the pot die.

After ejection from the pot die, the consolidated shaped article or articles are separated from the pressure transmitting material (PTM) by a method, such as pouring the liquid PTM through a screen, the densified bodies being retained on the screen which is described in greater detail in Timm, U.S. Pat. No. 4,744,943, at col. 10, lines 5–27, incorporated herein by reference. Any residual material remaining on the article or articles may be removed, for example, by sand blasting. The entire assembly may also be cooled to room temperature before removing the article or articles. The article or articles are, subsequently, removed from the hardened glass PTM, for example, by breaking the glass PTM with a hammer. Further finishing of the consolidated shaped article or articles may be performed by techniques, such as grinding and polishing.

The aggregate body after ROCing forms a consolidated shaped article that has a density of at least about 95 percent of theoretical. Preferably the consolidated article has a density of at least about 98 percent, more preferably at least about 99 percent and most preferably at least about 99.5 percent of theoretical.

Surprisingly, the interface between the separate bodies in the consolidated shaped article generally has a strength that is at least equal to the strength of the rest of the consolidated shaped article (i.e., the shaped article, when it breaks, generally does not break at an interface). The interface between two separate bodies of dissimilar materials (e.g., cermets having different binder metal concentrations) in the consolidated shaped body is also, generally, narrow. The interface is the region between separate bodies, after being consolidated, where the chemical composition or microstructure is different than the bulk of the consolidated separate bodies. However, if desired, the interface may be diffused by further heating after consolidating the separate bodies into the consolidated article.

After consolidating, for example, by ROC at a consolidating temperature where a liquid fails to form in at least one of the separate bodies, the interface between separate bodies within the consolidated shaped article, generally, is at most about 2 mm, preferably, in ascending preference, the interface is at most about 1 mm, at most about 0.75 mm, at most 0.5 mm, 0.25 mm, 0.1 mm, 50 micrometers and most preferably at most 25 micrometers.

The interface length and width, herein, are defined by the plane formed by the contact, for example, of a first and second body. The thickness of the interface is the distance measured orthogonal to the length and width of the interface. For example, when measuring the interface thickness beginning from the first body and moving toward the second body, the interface thickness is the distance starting at a point where at least one property, such as microstructure (e.g., grain size), chemistry (e.g., binder metal concentration of two contacting cermet bodies) or physical property (e.g., hardness) is about 10 percent different than the bulk property of the first body to a point where the same property is about 10 percent different than it is in the bulk of the second body.

The measurement or measurements of microstructure, chemistry or physical property used to determine the interface thickness may be made on a polished section by a known technique, such as previously described for grain size, electron diffraction of a scanning electron microscope's electron beam or Vickers hardness.

The method advantageously forms a consolidated shaped article of a cermet and a ceramic. The cermet-ceramic article comprises a cermet directly chemically bonded to a ceramic selected from the group consisting of a carbide and a carbonitride. Preferably the ceramic is harder than the cermet. Directly chemically bonded is a bond formed in the absence of a bonding agent, such as a brazing metal, metal interlayer or adhesive, such as an epoxy resin. That is to say, the interface is comprised of the constituents of the ceramic, cermet, reaction product of said constituents, or combination thereof. Preferably the cermet-ceramic body is formed using an essentially dense ceramic and essentially dense cermet, the cermet having a total amount of binder metal of at most about 6 percent by weight to at least about 2 percent by weight of the cermet. The ceramic is preferably comprised of a carbide and more preferably a binderless tungsten carbide or tungsten carbide-molybdenum carbide. The cermet is preferably comprised of a tungsten carbide-cobalt cemented carbide.

The cermet-ceramic article is preferably a rock drilling insert. The rock drilling insert preferably has the ceramic bonded to the cermet, such that the ceramic first contacts the rock during drilling. The rock drilling insert results in less wear compared to a rock drilling insert made only from cermets, such as cemented tungsten carbides.

The following example is solely for illustrative purposes and is not to be construed as limiting the scope of the present invention.

EXAMPLE

A binderless tungsten carbide-molybdenum carbide body available under the trade name ROCTEC 100™, from Boride Products, Traverse City, Mich., is contacted with a commercially available cemented tungsten carbide body having 10 percent by weight cobalt to form an aggregate body having a shape useful for rock drilling. The aggregate body is then wrapped with graphite foil to maintain the separate bodies positional relationship.

The cemented tungsten carbide body is a right cylinder that has been sliced on one end to form a wedge-like shape similar to the wedge of a screwdriver. The right cylinder has a diameter of about 0.45 inch and a total length including the wedge-like shape of about 0.6 inch. The flat wedge surfaces extend from the sliced end of the cylinder to a maximum of about 0.2 inch (i.e., slicing of an end of a cylinder creates, for example, a semicircular wedge surface) to the unsliced end of the cylinder. The binderless carbide body has a shape that essentially covers one of the flat wedge-like surfaces formed by slicing the end of the right cylinder and is about 0.03 inch thick. Both the binderless carbide and the cemented carbide have a density of greater than about 99 percent of theoretical density. The Vickers hardness of the cemented tungsten carbide is about 1300 Kg/mm$^2$ as determined by the method described by ASTM E384 using a load of 30 Kg and a dwell time of 15 seconds. The Vickers hardness of the binderless carbide is about 2700 Kg/mm$^2$.

The wrapped aggregate body is then placed into a fluid die containing PYREX glass frit, available from Corning Corp. The fluid die containing the wrapped aggregate body is placed in a furnace for about 2.5 hours. The furnace is purged continuously with nitrogen and is maintained at about 1275° C. (ROC preheat temperature). Upon being placed in the furnace and maintained at about 1275° C., the fluid die and parts heat up to about 1275° C. within about 2 to about 2.5 hours. The time the fluid die and parts are at the preheat temperature (1275° C.) has been determined to be about 15 to 30 minutes. The fluid die containing the wrapped aggregate body, while still at 1275° C., is then rapid omni-directionally compacted (ROCed) for about 10 seconds at about 830 MPa. The fluid die is allowed to cool to ambient temperature and the consolidated shaped article is removed from the PYREX glass that is formed from the PYREX frit.

The shaped article has an interface thickness of less than about 0.4 mm, as determined by optical microscopy of a polished section that orthogonally intersects the interface between the binderless carbide and cemented carbide of the consolidated shaped article formed after ROCing. The consolidated shaped article is useful as a rock drilling tool.

What is claimed is:

1. A consolidated shaped article comprised of (i) a cermet body directly chemically bonded to (ii) a ceramic body selected from the group consisting of a carbide and a carbonitride.

2. The article of claim 21 wherein the article is a rock drilling tool.

3. The article of claim 2 wherein the ceramic body is the carbide.

4. The article of claim 3 wherein the carbide is tungsten carbide or tungsten carbide-molybdenum carbide.

5. The article of claim 3 wherein the cermet body is a cemented carbide.

6. The article of claim 5 wherein the cemented carbide is a tungsten carbide-cobalt cemented carbide.

7. The article of claim 6 wherein the tungsten carbide-cobalt cemented carbide has a cobalt concentration of about 2 percent to about 6percent by weigh of the cemented carbide.

8. A consolidated shaped article comprised of (i) a cermet body directly chemically bonded to (ii) a ceramic body and having (ii) an interface that has a thickness of at most about 2 mm between said cermet and ceramic body.

* * * * *